(12) United States Patent
Fenech et al.

(10) Patent No.: US 8,005,422 B2
(45) Date of Patent: Aug. 23, 2011

(54) COMMUNICATION NETWORK

(75) Inventors: Hector Fenech, Issy les Moulineaux (FR); Emmanuel Lance, Clichy (FR)

(73) Assignee: Eutelsat, Paris (FR)

( * ) Notice: Subject to any disclaimer, the term of this patent is extended or adjusted under 35 U.S.C. 154(b) by 643 days.

(21) Appl. No.: 12/148,347

(22) Filed: Apr. 18, 2008

(65) Prior Publication Data

US 2009/0232046 A1  Sep. 17, 2009

(30) Foreign Application Priority Data

Mar. 17, 2008 (FR) .................................. 08 51723

(51) Int. Cl.
*H04B 7/185* (2006.01)

(52) U.S. Cl. ...................... 455/12.1; 455/13.1; 455/13.2; 370/316

(58) Field of Classification Search .................. 455/12.1, 455/13.1, 13.2; 370/316
See application file for complete search history.

(56) References Cited

U.S. PATENT DOCUMENTS

| | | | | |
|---|---|---|---|---|
| 6,765,953 B1 * | 7/2004 | Harms et al. | .................. | 375/150 |
| 7,245,930 B1 * | 7/2007 | Vishwanath et al. | ......... | 455/502 |
| 2004/0072539 A1 * | 4/2004 | Monte et al. | .................. | 455/13.4 |
| 2005/0260947 A1 * | 11/2005 | Karabinis et al. | ............ | 455/12.1 |
| 2006/0040613 A1 * | 2/2006 | Karabinis et al. | ............ | 455/12.1 |
| 2006/0040657 A1 * | 2/2006 | Karabinis et al. | ............. | 455/427 |
| 2007/0072545 A1 * | 3/2007 | Karabinis et al. | ............ | 455/12.1 |

FOREIGN PATENT DOCUMENTS

| | | |
|---|---|---|
| EP | 0 944 183 A | 9/1999 |
| EP | 1 267 502 A | 12/2002 |
| WO | WO 02/47357 A | 6/2002 |

* cited by examiner

*Primary Examiner* — Danh C Le
(74) *Attorney, Agent, or Firm* — Davidson, Davidson & Kappel, LLC

(57) ABSTRACT

A telecommunication network for establishing radiofrequency links between gateways and ground terminals via a multispot satellite, the network comprising a multispot satellite, a plurality of gateways, each gateway establishing a link with the satellite on at least Ns link channels corresponding to Ns frequency intervals $[f_i; f_{i+1}]$ with i varying from 0 to Ns−1 and a service area comprised of Nc cells each comprising a plurality of ground terminals, each cell being associated with a link spot beam with the satellite to which is allocated a frequency interval selected from among a plurality of frequency intervals $[f'_i; f'_{i+1}]$ with i varying from 0 to N−1, N being an integer strictly greater than 1, is disclosed. The frequency $f'_0$ is substantially equal to the frequency $f_{Ns}$ or the frequency $f'_N$ is substantially equal to the frequency $f_0$. Each of the gateways is located in one of the Nc cells. The cells in which the gateways are located are associated with a spot beam to which is allocated a frequency interval selected from among the frequency intervals $[f'_i; f'_{i+1}]$ with i varying from 1 to N−1 in the case where the frequency $f'_0$ is substantially equal to the frequency $f_{Ns}$ or $[f'_i; f'_{i+1}]$ with i varying from 0 to N−2 in the case where the frequency $f'_N$ is substantially equal to the frequency $f_0$.

12 Claims, 4 Drawing Sheets

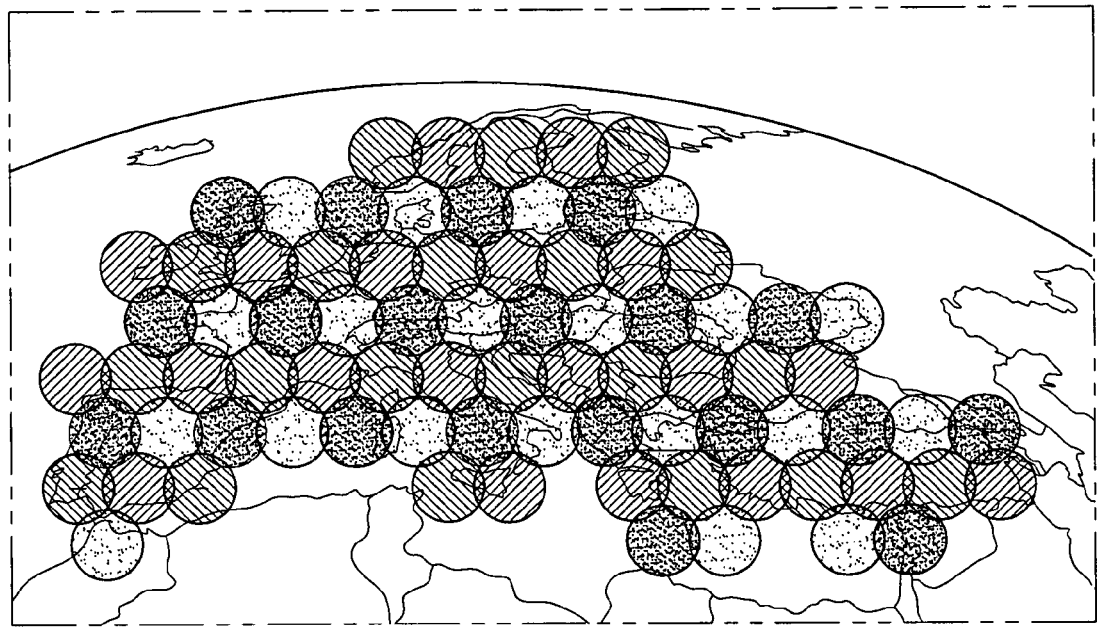
Fig. 3
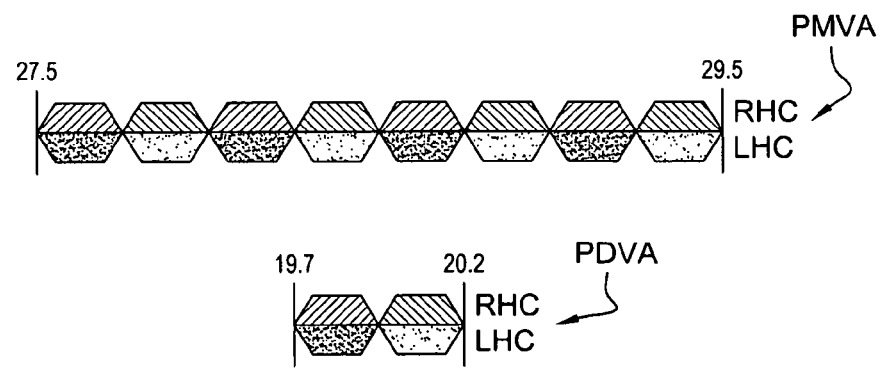
(a)
Fig. 4
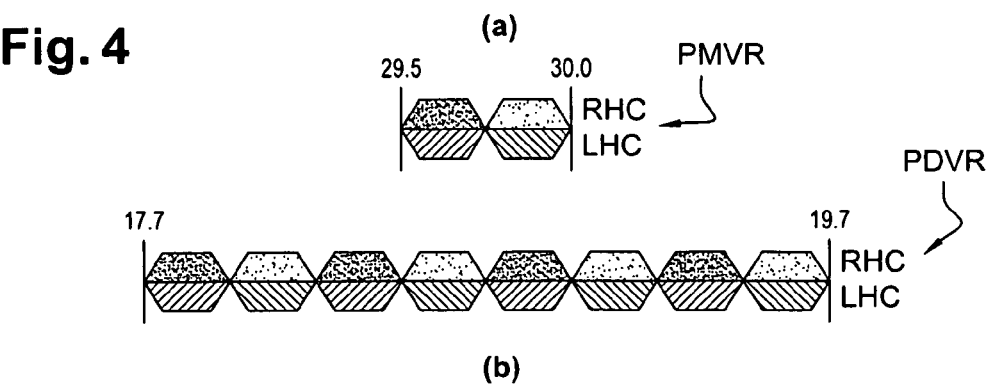
(b)

COMMUNICATION NETWORK

This claims priority to French Patent Application FR 08/51723, filed Mar. 17, 2008, the entire disclosure of which is incorporated by reference herein.

BACKGROUND

The present invention relates to a telecommunication network for establishing radiofrequency links between gateways and ground terminals via a multispot (called also multispot beam) telecommunication satellite. This type of satellite enables the use of several spot beams from antennas on board the satellite to cover contiguous geographic areas or cells, instead of a single large spot beam.

Such multispot satellites enable several radiofrequency links occupying the same frequency band on different spot beams to be established.

In the case of a broadband satellite telecommunication system, the satellite is used bidirectionally, which is to:
   relay data sent by a gateway (connected to the ground network) to a plurality of ground terminals: this first point to multipoint type link constitutes the forward link;
   relay to the gateway data sent by the ground terminals: this second multipoint to point type link constitutes the return link.

An example of a forward link in a multispot telecommunication network is illustrated in FIG. 1.

Signals are sent to a multispot satellite 3 over an uplink LM by a gateway 2 (also called a central station) such as a gateway connected to an Internet backbone 5. The gateway controls the network through a network management system that allows the operator to monitor and control all the components in the network. The signals sent by the gateway are then processed at the level of satellite 3 that amplifies the signals, derives the signals at a generally lower frequency and then retransmits the signals from the satellite antenna or antennas on a downlink LD in the form of a plurality of spot beams or spots forming basic coverage areas or cells C1 to C8 in which ground terminals 6 are situated. Each cell C1 to C8 is associated with a spot beam SP1 to SP8. It will be noted that, in the case of configuration 1, the eight cells C1 to C8 respectively associated with eight spot beams SP1 to SP8 form a group of cells served by the same gateway 2. The return link from the ground terminals 6 to the gateway 2 operates identically with an opposite communication direction.

Coordination of frequencies between operators is done in the context of regulation issued by the International Telecommunication Union (ITU): thus, by way of example, the band Ka for region 1 (Europe, Africa, Middle East) is defined in table 1 below:

TABLE 1

| Forward link | Uplink (from the gateway) | 27.5 GHz to 29.5 GHz |
| --- | --- | --- |
| | Downlink (to the ground terminals) | 19.7 GHz to 20.2 GHz |
| Return link | Uplink (from the ground terminals) | 29.5 GHz to 30.0 GHz |
| | Downlink (to the gateway) | 17.7 GHz to 19.7 GHz |

It is observed that the spectrums from band Ka in uplink are adjacent (i.e., the intervals [27.5; 29.5] and [29.5; 30] do not present any discontinuity). The same is true for spectrums from band Ka in downlink (i.e., the intervals [17.7; 19.7] and [19.7; 20.2] do not present any discontinuity).

Given that the gain from an antenna is inversely proportional to the opening of the spot beam, using multispot antennas to cover an extended zone with a homogeneous and elevated gain is necessary. The larger the number of spot beams, the smaller the opening of each spot beam will be. Thus, the gain on each spot beam and so the gain on the service area to cover will be increased. As we mentioned above, a service area to cover is formed by a plurality of contiguous cells (basic coverage areas), one spot beam being associated with each cell. A homogeneous multispot coverage area SA is represented in FIG. 2a), each cell being represented by a hexagon FH such that the coverage area is comprised of a plurality of hexagons FH in which $\theta_{cell}$ is the outer size of the cell expressed by the angle of the satellite associated with the coverage. However, as the antenna spot beam associated with each cell is not capable of producing a hexagonal form, a good approximation consists of considering a plurality of circular spot beams FC such as represented in FIG. 2b). The association of a spot beam with a cell is done by considering the best performance of the satellite for said spot beam, particularly in terms of EIRP (Equivalent Isotropically Radiated Power) and G/T figure of merit (gain to noise temperature ratio): a cell is determined to be the part of the service area associated with the spot beam that offers the highest gain on this zone from among all the satellite spot beams.

Configuration 1 such as represented in FIG. 1 uses a technique known as the frequency reuse technique: this technique enables the use of the same frequency range several times in the same satellite system in order to increase the total capacity of the system without increasing the allocated bandwidth.

Frequency reuse schemes, known as color schemes, making one color correspond to each of the satellite spot beams, are known. These color schemes are used to describe the allocation of a plurality of frequency bands to the satellite spot beams in view of radiofrequency transmissions to carry out in each of these spot beams. In these schemes, each color corresponds to one of these frequency bands.

In addition, these multispot satellites enable the sending (and receiving) of polarized transmissions: the polarization may be linear (in this case the two polarization directions are horizontal and vertical, respectively) or circular (in this case the two polarization directions are left circular or right circular, respectively). It will be noted that in the example from FIG. 1, the uplink leaving the gateway 2 uses two polarizations with four channels for each polarization, respectively Ch1 to Ch4 for the first polarization and Ch5 to Ch8 for the second polarization: the use of two polarizations allows the total number of gateways to be reduced. The eight channels Ch1 to Ch8, after processing by the payload of the satellite 3, will form the eight spot beams SP1 to SP8 (one channel being associated with one spot beam in this example).

According to a four-color scheme (red, yellow, blue, green) with a frequency spectrum of 500 MHz for each polarization, the transmissions being polarized in one of two right circular or left circular polarization directions, each color is associated with a 250 MHz band and a polarization direction.

In the rest of the description, we will take the following convention:
   the color red is represented by lines hatched to the right;
   the color yellow is represented by dense dots;
   the color blue is represented by lines hatched to the left;
   the color green is represented by dispersed dots.

A color is thus associated with each satellite spot beam (and thus a cell) such that the spot beams with the same "color" are non-adjacent: contiguous cells thus correspond to different colors.

An example of a four-color scheme for covering Europe is represented in FIG. 3. In this case, 80 cells are necessary to cover Europe.

This type of scheme is applicable equally well in uplink and in downlink. At the satellite level, a spot beam is created from a horn radiating towards a reflector. A reflector may be associated with a color such that four-color coverage is ensured by four reflectors. In other words, the generation of 16 spot beams from each gateway may be done by using four antennas (one per color) each having a reflector, four horns being associated with each reflector.

FIG. 4 illustrates a frequency plan broken down into an uplink frequency plan PMVA on the forward link, a downlink frequency plan PDVA on the forward link, an uplink frequency plan PMVR on the return link and a downlink frequency plan PDVR on the return link. The notations RHC and LHC respectively designate the right and left circular directions of polarization.

The PMVA plan corresponding to the forward uplink (from the gateway to the satellite) disposes 2 GHz (from 27.5 to 29.5 GHz) of available frequency spectrum such that 16 channels of 250 MHz of bandwidth are generated by a gateway (8 channels for each polarization). These 16 channels, after processing by the satellite payload, will form 16 spot beams. The assumption made here consists of considering that the entire 2 GHz spectrum is used: however, it will be noted that it is also possible, particularly for operational reasons, to use only one part of the spectrum and to generate fewer channels. In the example above, 16 spot beams (and thus 16 cells) are generated from two signals multiplexing the 8 channels (a signal multiplexed by polarization) generated by a gateway. Each multiplexed signal corresponding to a polarization is then processed at the satellite transponder level so as to provide 8 spot beams; each of these spot beams is associated with a frequency interval among the two frequency intervals [19.7; 19.95] and [19.95; 20.2] and with an RHC or LHC polarization as represented on the downlink frequency plan PDVA.

The PDVR plan corresponding to the return downlink (from the satellite to the gateway) disposes 2 GHz (from 17.7 to 19.7 GHz) of available frequency spectrum such that 16 spot beams of 250 MHz of bandwidth (associated with a frequency interval from among the two frequency intervals [29.5; 29.75] and [29.75; 30] and with an RHC or LHC polarization such as represented on the downlink frequency plan PMVR) issued from cells are multiplexed at the satellite level into two signals (corresponding to each polarization) to be returned to the gateway (8 channels for each polarization). We are still assuming that the entire 2 GHz spectrum is used.

It will be noted that the four-color scheme, for the forward link, associates one of the four following colors with each spot beam belonging to a pattern of four adjacent spot beams:
- a red color corresponding to a first band of 250 MHz (lower part of the available spectrum of 500 MHz) and to the right circular polarization direction;
- a yellow color corresponding to the same first band of 250 MHz and to the left circular polarization direction;
- a blue color corresponding to a second band of 250 MHz (upper part of the available spectrum of 500 MHz) and to the right circular polarization direction;
- a green color corresponding to the same second band of 250 MHz and to the left circular polarization direction;

The four adjacent spot beams with the same pattern are each associated with a different color.

On the return link, the polarizations are reversed so that the red and yellow colors have a left circular polarization and the blue and green colors have a right circular polarization. The ground terminals send and receive according to an opposite polarization such that one may easily separate the uplink signals from the downlink signals: such a configuration enables less costly terminals to be used.

In the case where the gateways are situated in the service area, it should be noted that the gateways are located in cells and thus share the same horn with the users. Subsequently, these particular cells will be designated by the term "gateway cell."

Thus, in uplink, the signal sent by each gateway cell is demultiplexed by a demultiplexer at the satellite level so as to separate the gateway signal from the ground terminals signal.

In addition, in downlink, the signal sent by the satellite to each gateway cell is multiplexed by a multiplexer at the satellite level so as to mix the signal intended for the gateway and the signal intended for the ground terminals.

SUMMARY OF THE INVENTION

These multiplexing and demultiplexing operations each necessitate the presence of a frequency guard band so as to enable the separation or combination of signals: this guard band constitutes a demarcation band width that prevents noise interference between the gateway signal and the gateway signal belonging to the same gateway cell, the two operations necessarily involving a filtering step that may only be effective if the signals are sufficiently separated in frequency from each other. FIG. 5 illustrates the use of a guard band on the respective downlink and uplink frequency plans. This guard band, typically having a width of 250 MHz (value given purely for illustration purposes), is situated for the uplink and downlink respectively:
- on the PMVA frequency plan corresponding to the forward uplink (from the gateway to the satellite) between 29.25 GHz and 29.5 GHz;
- on the PDVR frequency plan corresponding to the return downlink (from the satellite to the gateway) between 19.45 GHz and 19.7 GHz.

However, such a configuration is likely to pose several difficulties.

Actually, the fact that the guard band occupies part of the spectrum (PMVA plan or PDVR plan) leads to a reduction in the number of channels per gateway and thus to a reduction in the number of spot beams per gateway: this reduction implies that the gateway covers fewer cells than it would be able to do by using all of the frequency plan. By way of example, for a guard band width of 250 MHz, the number of cells served by the same sending station is reduced from 16 to 14. Thus, in order to cover the same service area, such a reduction leads to an increase in the number of gateways.

It is an object of the present invention to provide a telecommunication network for the establishment of radiofrequency links between gateways and ground terminals via a telecommunication satellite with several spot beams, known as a multispot satellite, said network including gateways located in service zone cells without reducing the number of cells covered by each gateway.

For this purpose, the invention proposes a telecommunication network for establishing radiofrequency links between gateways and ground terminals via a telecommunication satellite with several spot beams, known as a multispot satellite, said network including:
- a multispot satellite,
- a plurality of gateways, each gateway establishing a link with said satellite on at least Ns link channels corresponding to Ns frequency intervals $[f_i; f_{i+1}]$ with i varying from 0 to Ns−1 and, a service area comprised of Nc cells each comprising a plurality of ground terminals, each cell being associated with said satellite to which is allocated a frequency interval selected from among a plurality of frequency intervals $[f_i; f_{i+1}]$ with i varying from 0 to N−1, N being an integer strictly greater than 1, frequency $f'_0$ being substantially equal to frequency $f_{Ns}$, or frequency $f'_N$ being substantially equal to frequency $f_0$, each of said gateways being located in one of said Nc cells, said network being characterized in that the cells in which said gateways are located are associated with a spot beam to which is allocated a frequency interval selected from among the frequency intervals:

$[f'_i; f'_{i+1}]$ with i varying from 1 to N−1 in the case where frequency $f'_0$ is substantially equal to frequency $f_{Ns}$, such that no gateway of said network is located in a cell associated with a spot beam to which frequency interval $[f'_0; f'_1]$ is allocated.

$[f'_i; f'_{i+1}]$ with i varying from 0 to N-2 in the case where frequency $f'_N$ is substantially equal to frequency $f_0$, such that no gateway of said network is located in a cell associated with a spot beam to which frequency interval $[f'_{N-1}; f'_N]$ is allocated.

"Gateway" is understood to refer to any gateway such as a ground communication gateway connected to an Internet backbone. The gateway sends signals over a forward link that are then processed at the satellite level which amplifies the signals, derives the signals at a different frequency (generally lower), then retransmits the signals from the satellite antenna or antennas over a downlink in the form of a plurality of spot beams forming basic coverage zones or cells in which the ground terminals are situated.

It will be noted that the difference $(f_{i+1}-f_i)$ corresponds to the width of the link channel available for terminals from the associated cell.

The phrase "frequency $f'_0$ is substantially equal to frequency $f_{Ns}$," is understood to mean either that frequency $f'_0$ is equal to frequency $f_{Ns}$ or that $f'_0=f_{Ns}+f_B$ with $f_B$ having a positive value strictly less than the width of the guard band. Even if the rest of the description will focus more on the case where frequency $f'_0$ and frequency $f_{Ns}$ are equal, it may also be that these two frequencies are too close to each other to obtain the desired performances without using a guard band: in this case, as long as the bandwidth that separates them is strictly less than the guard band (typically 250 MHz in the case of the Ka band) necessary to ensure effective signal separation or combination, the network according to the invention also finds an interesting application.

In addition, the phrase "frequency $f'_N$ is substantially equal to frequency $f_0$," is understood to mean either that frequency $f'_N$ is equal to frequency $f_0$ or that $f_0=f_N+f_B$ with $f_B$ having a positive value strictly less than the width of the guard band.

The invention finds a more particularly interesting application in Ka band: in this configuration, frequencies $f'_0$ and $f_{Ns}$ are equal to 29.5 GHz. However, the invention generally applies when the bands allocated for gateways and for terminals are adjacent (i.e., in contact via a common frequency), that the band allocated for gateways is below the band allocated for cells (the case where frequency $f_0$ is equal to frequency $f_{Ns}$) or above (the case where frequency $f'_N$ is equal to frequency $f_0$).

As a general rule, we will work on two polarizations with 2×Ns channels (Ns channels per polarization).

Thanks to the invention, the gateways are located only in cells sending or receiving in frequency intervals occupying the high part of the spectrum allocated to them. In other words, the gateways are prohibited from occupying a cell establishing a radiofrequency link in the interval $[f'_0; f'_1]$, that is, the frequency interval immediately contiguous with the spectrum allocated to the gateway. Thus, this interval $[f'_0; f'_1]$ is advantageously used to separate in frequency the signal from the gateway and the signal from the ground terminals belonging to the same gateway cell without having recourse to a guard band. Doing this, the channels normally occupied by the guard band are recovered and thus increasing the number of gateways to cover the service area is avoided.

The network according to the invention may also present one or more of the characteristics below, considered individually or according to all technically possible combinations:

Each gateway establishes a link with said satellite on 2×Ns link channels, the 2×Ns channels including:
  Ns channels associated with a first polarization and corresponding to said Ns frequency intervals $[f_i; f_{i+1}]$ with i varying from 0 to Ns−1 and,
  Ns channels associated with a second polarization and corresponding to said Ns frequency intervals $[f_i; f_{i+1},]$ with i varying from 0 to Ns-1, each cell being associated with a spot beam to which one of said first or second polarizations is allocated.

Said frequency intervals belonging to the band Ka.

In the case of uplinks, on the one hand between said gateways and said satellite and on the other hand between said cells and said satellite, the cells in which said gateways are located are associated with a spot beam to which is allocated the frequency interval [29.75 GHz; 30 GHz], no gateway of said network being located in a cell associated with a spot beam to which the frequency interval is allocated [29.5 GHz; 29.75 GHz] (in this case $f'_0=f_{Ns}=29.5$ GHz).

In the case of downlinks, on the one hand between said gateways and said satellite and on the other hand between said cells and said satellite, the cells in which said gateways are located are associated with a spot beam to which is allocated the frequency interval [19.95 GHz; 20.2 GHz], no gateway of said network being located in a cell associated with a spot beam to which is allocated the frequency interval [19.7 GHz; 19.95 GHz] (in this case $f_{Ns}=19.7$ GHz).

Each cell is associated with one of the four following colors:
  a first color corresponding in uplink to the frequency interval [29.5 GHz; 29.75 GHz] coupled to a first polarization and in downlink to the frequency interval [19.7 GHz; 19.95 GHz] coupled to a second polarization opposite from said first polarization;
  a second color corresponding in uplink to the frequency interval [29.75 GHz; 30 GHz] coupled to said second polarization and in downlink to the frequency interval [19.95 GHz; 20.2 GHz] coupled to said first polarization;
  a third color corresponding in uplink to the frequency interval [29.5 GHz; 29.75 GHz] coupled to said second polarization and in downlink to the frequency interval [19.7 GHz; 19.95 GHz] coupled to said first polarization;
  a fourth color corresponding in uplink to the frequency interval [29.75 GHz; 30 GHz] coupled to said first polarization and in downlink to the frequency interval [19.95 GHz; 20.2 GHz] coupled to said second polarization;

the cells in which said gateways are located only being cells from said second or fourth color.

Said first polarization is a right circular polarization and said second polarization is a left circular polarization.

The number Ns of channels is equal to eight.

The number Ns of channels is equal to five.

The integer N is equal to 2.

Another object of the present invention is a method to allocate a gateway to a cell in a telecommunication network according to the invention, said method including a step of selecting a frequency interval selected from among the frequency intervals $[f_i; f_{i+1}]$ with i varying from 1 to N−1 such that said gateway is not located in a cell associated with a spot beam to which is allocated the frequency interval $[f_{Ns}; f_1]$.

BRIEF DESCRIPTION OF THE DRAWINGS

Other characteristics and advantages of the invention will emerge more clearly from the description given below, for indicative and in no way limiting purposes, with reference to the attached figures, among which:

FIG. 2 b) represents an approximation of the coverage area from FIG. 2 a) comprised of a plurality of circular spot beams;

FIG. 3 illustrates a four-color scheme for the coverage of Europe;

FIG. 4 illustrates a frequency plan in band Ka;

In all figures, common elements bear the same reference numbers.

DETAILED DESCRIPTION

Figure 1:
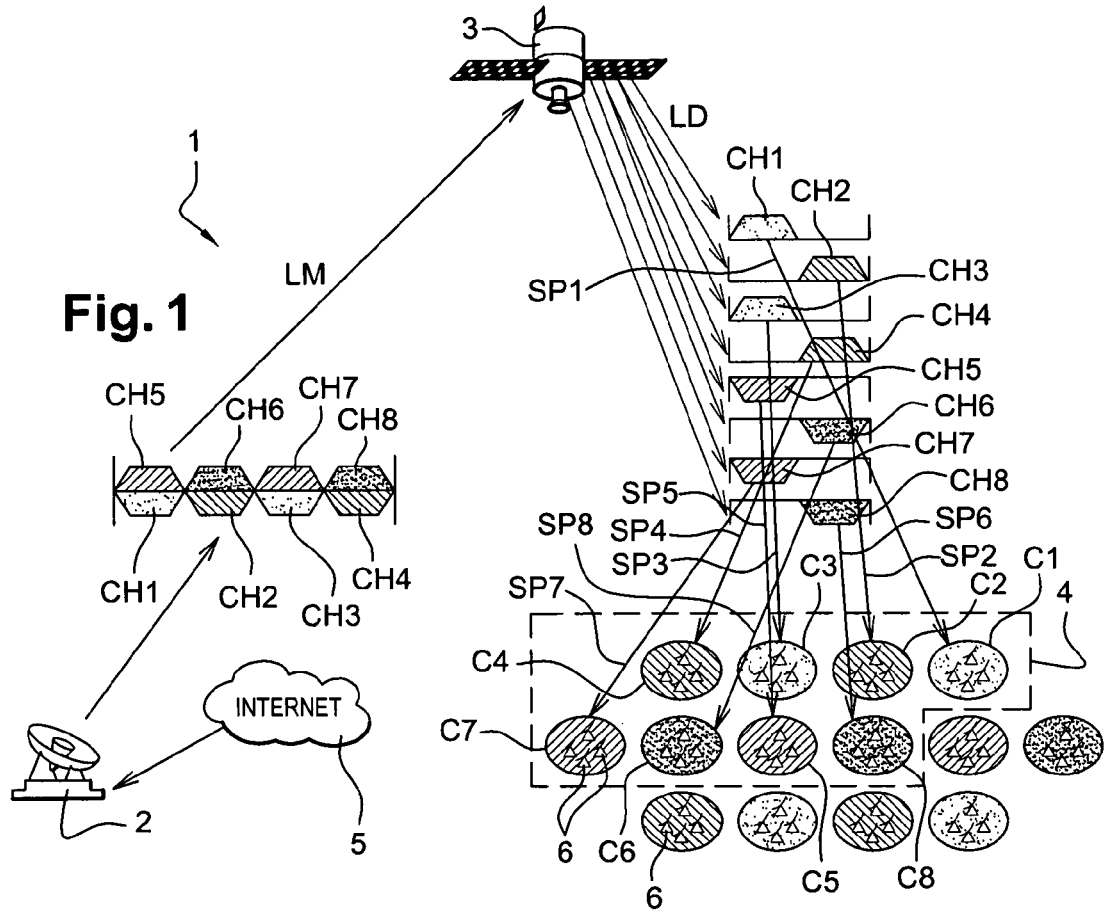
FIG. 1 is a simplified schematic representation of a multispot configuration.
Figure 2:
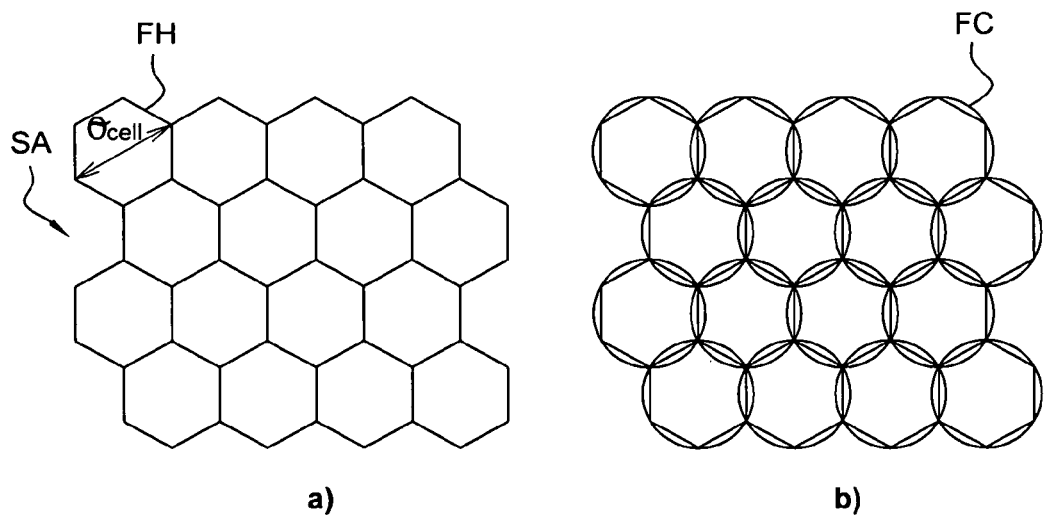
FIG. 2 a) represents an example of a coverage area comprised of a plurality of adjacent hexagons.
Figure 5:
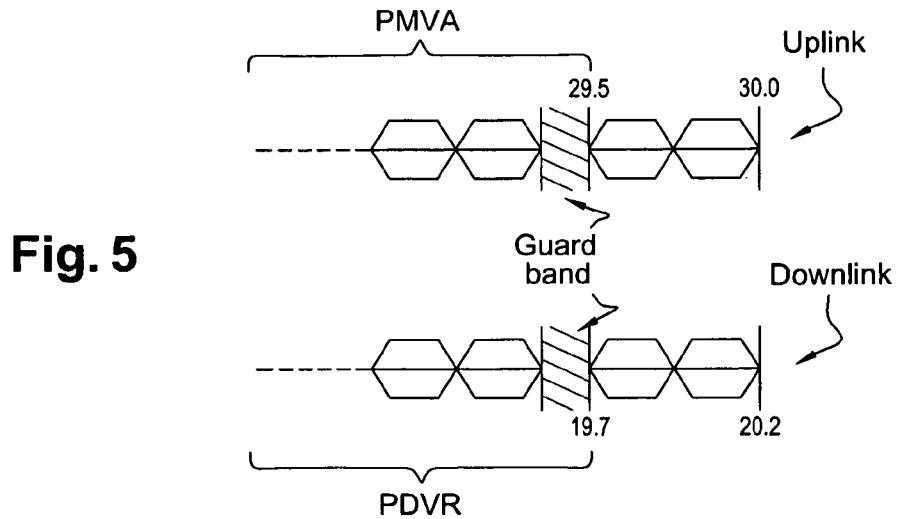
FIG. 5 illustrates the use of a guard band on the respective downlink and uplink frequency plans in band Ka.
Figure 6:
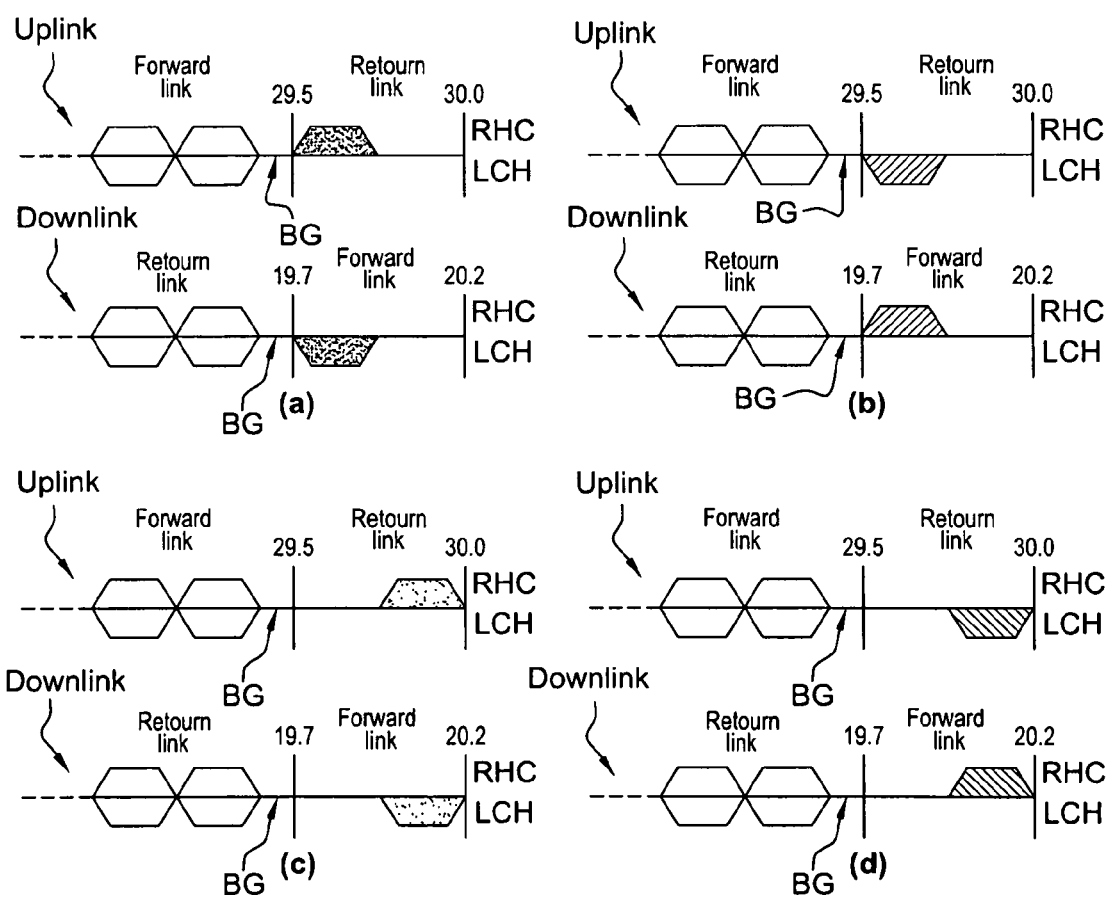
FIGS. 6 a) to d) represent the colors of the cells in which gateways may be located in a network according to the prior art.

FIGS. 6 a) to d) represent the different possible locations of gateways according to the colors of the cells in a network according to the prior art. The colors identify the characteristics of the channels for the terminals in the cells.

Each cell is associated with one of the four following colors:

a first yellow color (FIG. 6 a) corresponding in uplink to the frequency interval [29.5 GHz; 29.75 GHz] coupled to a right circular polarization RHC and in downlink to the frequency interval [19.7 GHz; 19.95 GHz] coupled to a left circular polarization LHC;

a second blue color (FIG. 6 d) corresponding in uplink to the frequency interval [29.75 GHz; 30 GHz] coupled to a left circular polarization LHC and in downlink to the frequency interval [19.95 GHz; 20.2 GHz] coupled to a right circular polarization RHC;

a third red color (FIG. 6 b) corresponding in uplink to the frequency interval [29.5 GHz; 29.75 GHz] coupled to a left circular polarization LHC and in downlink to the frequency interval [19.7 GHz; 19.95 GHz] coupled to a right circular polarization RHC;

a fourth green color (FIG. 6 c) corresponding in uplink to the frequency interval [29.75 GHz; 30 GHz] coupled to a right circular polarization RHC and in downlink to the frequency interval [19.95 GHz; 20.2 GHz] coupled to a left circular polarization LHC.

The four-color scheme is symmetrical between the forward link and the return link. Thus, a cell has the same color in reception and in transmission. On the other hand, this color does not correspond to the same frequency in forward link (reception of the signal sent by the satellite between 19.7 and 20.2 GHz) an in return link (sending in the direction of the satellite between 29.5 and 30.0 GHz). Furthermore, the polarization is reversed between the signal sent and the signal received, which enables the use of simpler and less costly terminals, the separation between the signal sent and the signal received is done by polarization and does not necessitate specific filtering.

In a network according to the prior art, the gateways may thus occupy all possible cells (i.e., of any color), this implies the presence of a guard band BG (typically 250 MHz between 29.25 GHz and 29.5 GHz for the forward uplink and between 19.45 GHz and 19.7 GHz for the return downlink). As we have already mentioned, this guard band occupies part of the spectrums respectively usable for sending from gateways to the satellite and for receiving signals sent by the satellite to the gateways. This occupation leads to a reduction in the number of channels per gateway and thus a reduction in the number of spot beams per gateway. Thus, in order to cover the same service area, such a reduction leads to an increase in the number of gateways.

Figure 7:
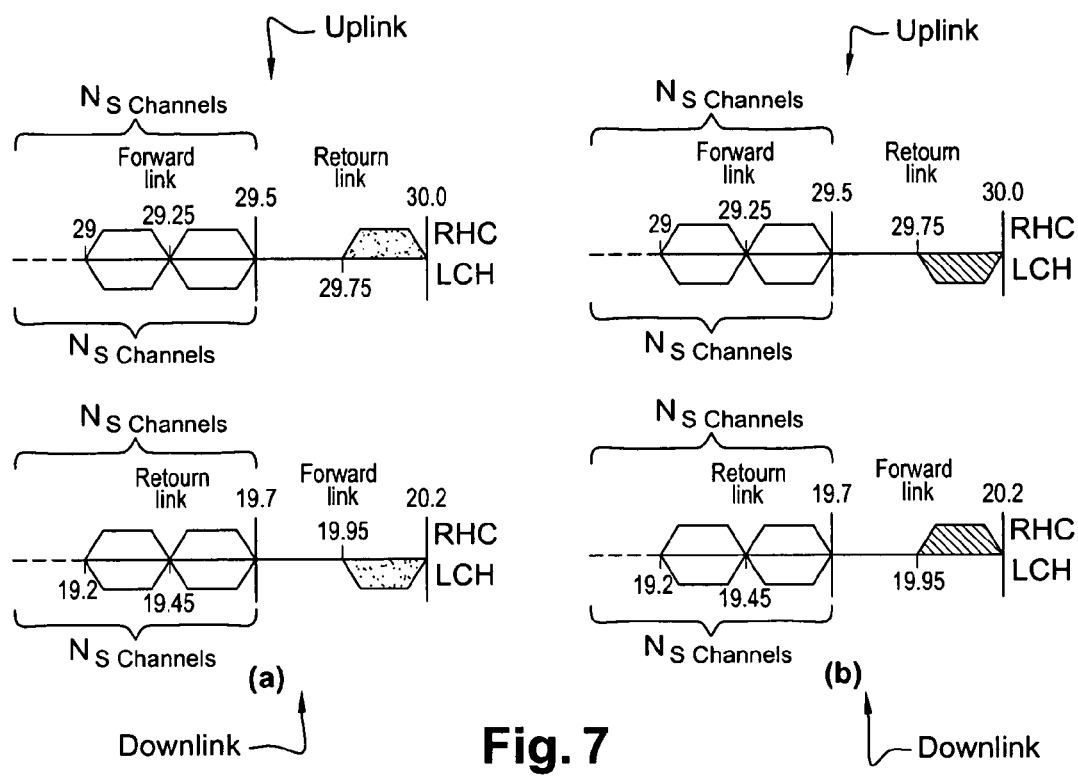
FIGS. 7 a) and b) represent the different possible locations of gateways in a network according to the invention.

FIGS. 7 a) and b) represent the different possible locations of gateways according to the colors of the cells in a network according to the invention.

The telecommunication network according to the invention enables the establishment of radiofrequency links between gateways and ground terminals via a multispot telecommunication satellite.

The network thus comprises:

a multispot satellite, a plurality of gateways, each gateway establishing:

an uplink for sending in forward link signals to the satellite on 2×Ns (in our example, 16 channels with Ns=8) link channels, each channel corresponding to a right RHC or left LHC circular polarization and to one of the following eight intervals: [27.5 GHz; 27.75 GHz]-[27.75 GHz; 28 GHz]-[28 GHz; 28.25 GHz]-[28.25 GHz; 28.5 GHz]-[28.5 GHz; 28.75 GHz]-[28.75 GHz; 29 GHz]-[29 GHz; 29.25 GHz]-[29.25 GHz; 29.5 GHz] (by way of illustration, only intervals [29 GHz; 29.25 GHz]-[29.25 GHz; 29.5 GHz] are represented here).

a downlink for the reception in return link of signals from the satellite on 2×Ns (in our example, 16 channels with Ns=8) link channels, each channel corresponding to a right RHC or left LHC circular polarization and to one of the following intervals: [17.7 GHz; 17.95 GHz]-[17.95 GHz; 18.2 GHz]-[18.2 GHz; 18.45 GHz]-[18.45 GHz; 18.7 GHz]-[18.7 GHz; 18.95 GHz]-[18.95 GHz; 19.2 GHz]-[19.2 GHz; 19.45 GHz]-[19.45 GHz; 19.7 GHz] (by way of illustration, only intervals [19.2 GHz; 19.45 GHz]-[19.45 GHz; 19.7 GHz] are represented here).

We start here assuming a channel width equal to 250 MHz; of course, this value is given purely for illustration reasons and the invention also applies to other channel width values.

Contrary to the network according to the prior art, the gateways here are exclusively located in:

green color cells (FIG. 7 a) corresponding in uplink to the frequency interval [29.75 GHz; 30 GHz] coupled to a right circular polarization RHC and in downlink to the frequency interval [19.95 GHz; 20.2 GHz] coupled to a left circular polarization LHC;

blue color cells corresponding in uplink to the frequency interval [29.75 GHz; 30 GHz] coupled to a left circular polarization LHC and in downlink to the frequency interval [19.95 GHz; 20.2 GHz] coupled to a right circular polarization RHC.

In other words, red and yellow cells are prohibited from the gateways so that no gateway is found in a cell sending in interval [29.5 GHz; 29.75 GHz] and receiving in interval [19.7 GHz; 19.95 GHz].

For the record, a cell has the same color in reception and in sending. On the other hand, this color does not correspond to the same frequency in forward link (reception of the signal sent by the satellite between 19.7 and 20.2 GHz) an in return link (sending in the direction of the satellite between 29.5 and 30.0 GHz). In addition, the polarization is reversed between the sent signal and the received signal.

Therefore, it is equivalent to say that the gateways are found:
  in a blue or green cell;
  in a right or left circular polarization associated with a frequency interval [29.75 GHz; 30 GHz] in uplink;
  in a right or left circular polarization cell associated with a frequency interval [19.95 GHz; 20.2 GHz] in downlink.

The fact that the red and yellow cells are not occupied enables frequency bands [29.5 GHz; 29.75 GHz] and [19.7 GHz; 19.95 GHz] to be advantageously used to respectively separate in frequency without having recourse to a guard band:
  the signal sent from a gateway and the signal sent from ground terminals belonging to the same gateway to the satellite;
  the signal sent by the satellite to a gateway and the signal sent by the satellite to ground terminals belonging to the same gateway.

Figure 8:
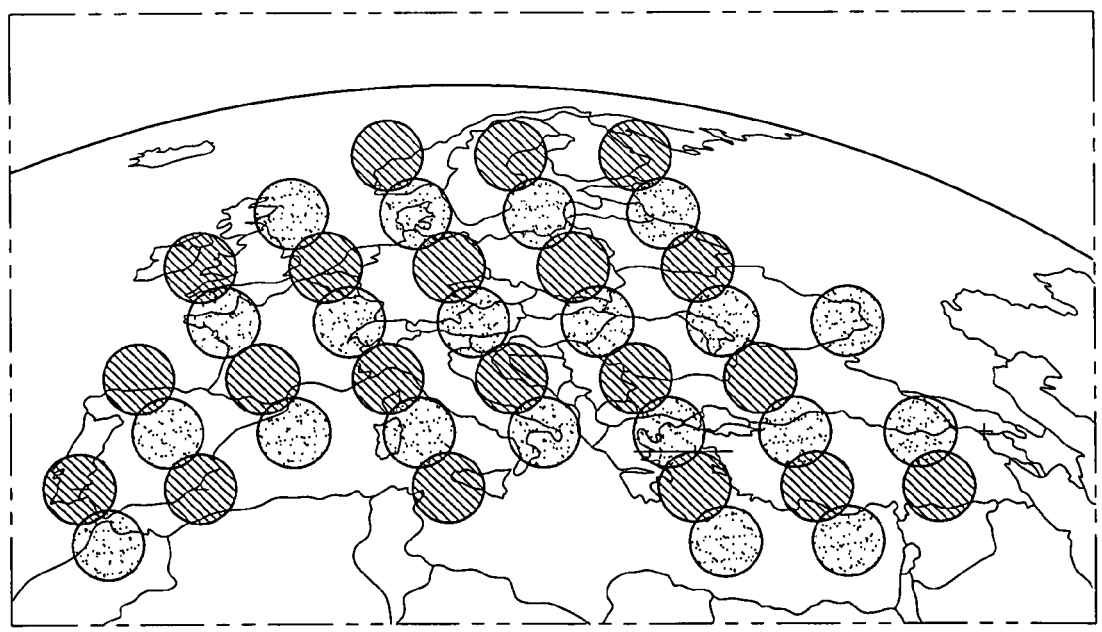
FIG. 8 illustrates the cells potentially usable by gateways in the case of the coverage of Europe in a network according to the invention.

By forcing the position of the gateways to two types of cells, the number of possible cells is reduced by two. FIG. 8 illustrates the cells potentially usable (blue or green) by a gateway in the case of the coverage of Europe. It may be observed that gateways may be found in 40 cells (versus the 80 necessary to cover Europe represented in FIG. 3).

Of course, the invention is not limited to the embodiment that has just been described.

Thus, the invention was more particularly described in the case of the band Ka but it may also apply to other types of frequency bands, particularly higher frequency bands such as the Q/V band; the invention generally applies when the bands allocated for the gateways and for the terminals are adjacent (i.e., in contact via a common frequency).

In addition, the invention was described in the case of a number Ns of channels equal to 8 for each polarization (16 channels in total). It may be that part of the band is not usable, for example the part going from 17.7 to 18.45 GHz in return link and the part going from 27.5 to 28.25 GHz in forward link: in this case, the number of channels Ns per polarization is equal to 5.

Furthermore, even if the invention was more specifically described for a network using one polarization, it also applies to a network without polarization.

What is claimed is:

1. A telecommunication network for establishing radiofrequency links between gateways and ground terminals via a telecommunication satellite with several spot beams, designated as a multispot satellite, said network comprising:
  a multispot satellite,
  a plurality of gateways, each gateway establishing a link with said satellite on at least Ns link channels corresponding to Ns frequency intervals $[f_i; f_{i+1}]$ with i varying from 0 to Ns−1 and,
  a service area comprised of Nc cells each comprising a plurality of ground terminals, each cell being associated with a link spot beam with said satellite to which is allocated a frequency interval selected from among a plurality of frequency intervals $[f'_i; f'_{i+1}]$ with i varying from 0 to N−1, N being an integer strictly greater than 1, frequency $f'_0$ being substantially equal to frequency $f_{Ns}$, or frequency $f'_N$ being substantially equal to frequency $f_0$,
  each of said gateways being located in one of said Nc cells, the cells in which said gateways are located are associated with a spot beam to which is allocated a frequency interval selected from among the frequency intervals:
  $[f'_i; f'_{i+1}]$ with i varying from 1 to N−1 in the case where frequency $f'_0$ is substantially equal to frequency $f_{Ns}$, such that no gateway of said network is located in a cell associated with a spot beam to which frequency interval $[f'_0; f'_1]$ is allocated;
  $[f'_i; f'_{i+1}]$ with i varying from 0 to N−2 in the case where frequency $f'_N$ is substantially equal to frequency $f_0$, such that no gateway of said network is located in a cell associated with a spot beam to which frequency interval $[f'_{N-1}; f'_N]$ is allocated.

2. The network according to claim 1 wherein each gateway establishes a link with said satellite over 2×Ns link channels, the 2×Ns channels including:
  Ns channels associated with a first polarization and corresponding to said Ns frequency intervals $[f_i; f_{i+1}]$ with i varying from 0 to Ns−1 and,
  Ns channels associated with a second polarization and corresponding to said Ns frequency intervals $[f_i; f_{i+1}]$ with i varying from 0 to Ns−1, each cell being associated with a spot beam to which one of said first or second polarizations is allocated.

3. The network according to claim 1 wherein said frequency intervals belong to band Ka.

4. The network according to claim 1 wherein:
  $f'_0 = f_{Ns} + f_B$ with $f_B$ having a positive value strictly less than the width of the guard band, or
  the frequency $f_0 = f'_N + f'_B$ with $f'_B$ having a positive value strictly less than the width of the guard band.

5. The network according to claim 1 wherein the frequency $f'_0$ is equal to the frequency $f_{Ns}$, or the frequency $f'_N$ is equal to the frequency $f_0$.

6. The network according to claim 5 wherein, in the case of uplinks, on the one hand between said gateways and said satellite and on the other hand between said cells and said satellite, the cells in which said gateways are located are associated with a spot beam to which is allocated the frequency interval [29.75 GHz; 30 GHz], each gateway of said network not being located in a cell associated with a spot beam to which is allocated the frequency interval [29.5 GHz; 29.75 GHz].

7. The network according to claim 5 wherein, in the case of downlinks, on the one hand between said gateways and said satellite and on the other hand between said cells and said satellite, the cells in which said gateways are located are associated with a spot beam to which is allocated the frequency interval [19.95 GHz; 20.2 GHz], no gateway of said network is located in a cell associated with a spot beam to which is allocated the frequency interval [19.7 GHz; 19.95 GHz].

8. The network according to claim 5 wherein cell is associated with one of the following four colors:
- a first color corresponding in uplink to the frequency interval [29.5 GHz; 29.75 GHz] coupled to a first polarization and in downlink to the frequency interval [19.7 GHz; 19.95 GHz] coupled to a second polarization opposite from said first polarization;
- a second color corresponding in uplink to the frequency interval [29.75 GHz; 30 GHz] coupled to said second polarization and in downlink to the frequency interval [19.95 GHz; 20.2 GHz] coupled to said first polarization;
- a third color corresponding in uplink to the frequency interval [29.5 GHz; 29.75 GHz] coupled to said second polarization and in downlink to the frequency interval [19.7 GHz; 19.95 GHz] coupled to said first polarization;
- a fourth color corresponding in uplink to the frequency interval [29.75 GHz; 30 GHz] coupled to said first polarization and in downlink to the frequency interval [19.95 GHz; 20.2 GHz] coupled to said second polarization;

the cells in which said gateways are located only being cells from said second or fourth color.

9. The network according to claim 8 wherein said first polarization is a right circular polarization and said second polarization is a left circular polarization.

10. The network according to claim 1 wherein the number Ns of channels is equal to eight.

11. The network according to claim 1 wherein the number Ns of channels is equal to five.

12. The network according to claim 1 wherein the integer N is equal to 2.

* * * * *